United States Patent [19]

Matz et al.

[11] Patent Number: 5,037,507
[45] Date of Patent: Aug. 6, 1991

[54] METHOD OF MANUFACTURING AN INSULATING ARRANGEMENT FOR OPTICAL INSULATION OF INTEGRATED COMPONENTS

[75] Inventors: Richard Matz, Feldkirchen/Westerham; Jutta Zirrgiebel, Munich, both of Fed. Rep. of Germany

[73] Assignee: Siemens Aktiengesellschaft, Munich, Fed. Rep. of Germany

[21] Appl. No.: 478,021

[22] Filed: Feb. 9, 1990

Related U.S. Application Data

[63] Continuation of Ser. No. 302,480, Jan. 27, 1989, Pat. No. 4,929,515.

[30] Foreign Application Priority Data

Feb. 19, 1988 [DE] Fed. Rep. of Germany ....... 3805278

[51] Int. Cl.$^5$ .............................................. B23K 26/00
[52] U.S. Cl. .................................. 156/647; 156/643; 156/648; 156/659.1; 156/662
[58] Field of Search ............ 156/647, 648, 643, 659.1, 156/662; 219/121.68; 250/578, 211 R; 357/16, 48, 52, 84, 30, 17; 428/596, 614, 620, 642, 615

[56] References Cited

U.S. PATENT DOCUMENTS

| | | | |
|---|---|---|---|
| 3,947,840 | 3/1976 | Cruford et al. | 357/17 |
| 4,142,198 | 2/1979 | Finnila et al. | 357/24 |
| 4,190,851 | 2/1980 | Finnila et al. | 357/30 |
| 4,246,590 | 1/1987 | Thomas et al. | 357/30 |
| 4,282,290 | 8/1981 | Pellicori et al. | 350/164 |
| 4,365,259 | 12/1982 | Schroder | 357/30 |
| 4,493,113 | 1/1965 | Forrest et al. | 455/606 |
| 4,560,877 | 12/1985 | Hoffman | 250/366 |
| 4,707,716 | 11/1987 | Danielle | 357/17 |
| 4,709,413 | 11/1987 | Forrest et al. | 455/606 |
| 4,720,426 | 1/1988 | Englert et al. | 250/367 |
| 4,879,250 | 11/1989 | Chan | 437/3 |
| 4,973,133 | 11/1990 | Matz et al. | 156/647 |

Primary Examiner—John J. Zimmerman
Attorney, Agent, or Firm—Hill, Van Santen, Steadman & Simpson

[57] ABSTRACT

An isolating arrangement for isolating a portion of a substrate from the remaining portions of the substrate, characterized by the arrangement comprising a pair of obliquely extending slots which merge with each other in the interior of the substrate to isolate a portion or region of the substrate from the remaining portion, except at least at one end of the portion extending between the slots. The slots are preferably formed by a laser-induced, wet-chemical etching and, subsequent to forming the slots, they can be filled with a material, such as metal or a ternary absorber material, to increase the isolation of the substrate region or portion.

6 Claims, 1 Drawing Sheet

METHOD OF MANUFACTURING AN INSULATING ARRANGEMENT FOR OPTICAL INSULATION OF INTEGRATED COMPONENTS

This is a division of application Ser. No. 07/302,480, filed Jan. 27, 1989, now U.S. Pat. No. 4,929,515.

BACKGROUND OF THE INVENTION

The present invention is directed to an insulating means for optical insulation of components which are integrated on a substrate for integrated optics. The invention is also directed to a method for making the insulating means.

Integrated optical components on an InP substrate are considered cost beneficial for optical communication transmission because planar technology replaces micro optics and micro mechanics. However, as a consequence of integration, the interaction between the individual components increases so that an undesired cross-talk arises between various transmission channels. Integration is therefore meaningful only to the extent to which one succeeds in realizing component structures with a high cross-talk attenuation.

Semi-insulating substrates, separating trenches and, in addition, shielding electrodes have been used for improving the electrical cross-talk attenuation for epitaxially grown components. Measures have also been undertaken against optical cross-talk in integrated optics. Light absorbing InGaAs layers are sometimes used for this purpose on substrates of InP. An example of this is disclosed in an article by Bornholdt et al "WAVEGUIDE-INTEGRATED PIN PHOTODIODE ON InP", *Electronics Letters*, Vol. 23, No. 1, 2nd January 1987, pp. 2-4. The layer of thickness needed for complete absorption cannot be realized with the standard epitaxial method. Since the scattered light is uniformly distributed by multiple reflections in the crystal due to a high refractive index, individual separating trenches also seem rather unpromising.

SUMMARY OF THE INVENTION

The object of the present invention is to provide an insulating means with which integrated components can be largely decoupled from the optical disturbances transmitted in the substrate and to a method for forming the insulating means. These objects are obtained in an improved insulating means for optical insulation of optical components on a substrate for integrated optics wherein the insulating means is composed of at least two slots formed in the surface of the substrate and proceeding at a distance side-by-side along the surface, said slots extending into the substrate obliquely in a direction towards one another to a depth to merge or intersect with one another so as to isolate a separate portion of the substrate or substrate region between the two slots from the remainder or remaining portions of the substrate, said substrate region being connected to the remaining portion at least at one end of the path formed by said slots.

In the insulating means of the present invention, an element, for example a photodiode, which is integrated on the surface of the substrate region lying between the two slots can be better decoupled from the scattered light in the substrate. The substrate region is preferably monolithically joined to the substrate at the two ends so that contacts for active elements can also be provided on the surface of the substrate. Scattered light can proceed into the substrate region only over these end connections and can possibly pass with a low transmission through the slots.

The insulating means of the invention are very advantageously used in substrates of InP.

To further reduce the slight transmission through the slots, it is expedient that the slots be filled with a light blocking material or a light absorbing material, such as a metal or a ternary absorbing material, such as InGaAs, respectively. The filling of the slots will improve the thermic coupling and the demand for a low dissipated power of the insulating component that otherwise exists can also be eliminated.

The insulating means of the invention is manufactured in a very simple way by a method comprising the steps of providing a substrate having a surface, impinging two laser rays or beams that are directed onto the substrate's surface obliquely in a direction towards one another and impinge on a surface limited only in a stripped-shape region that proceeds at a distance next to one another to define slots in the substrate, while impinging the laser rays, laser-induced chemically etching the substrate in the region of the laser rays contact to a depth that occurs with the slots merging or intersecting with one another in the interior of the substrate. Preferably, prior to impinging the laser rays or beams on the substrate, the method includes providing a shadow mask having two parallel extending slots to limit the portion of the surface of the substrate contacted by the two laser beams. After forming the slots, the slots may be filled with the metal or the ternary absorbing material or some other material after this manufacturing. Filling with metal can be carried out by a metal deposition.

Other advantages and features of the invention will be readily apparent from the following description of preferred embodiments, the drawings and claims.

DESCRIPTION OF THE PREFERRED EMBODIMENTS

Figure 2:
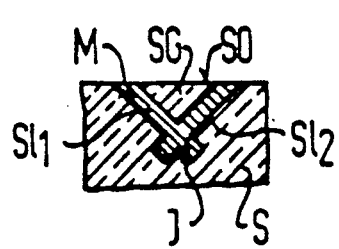
FIG. 2 is a cross sectional view of the insulating means of the present invention, wherein the slots are filled with a metal.
Figure 3:
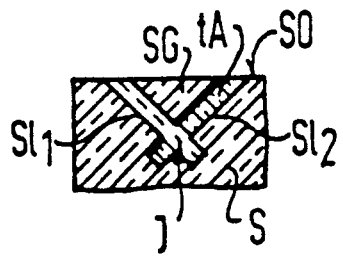
FIG. 3 is a cross sectional view similar to FIG. 2, wherein the slots are filled with a ternary absorbing material.

The principles of the present invention are particularly useful for forming an insulating means, generally indicated at J in FIGS. 2 and 3, for a substrate S. The substrate S has a surface SO and the insulating means J is formed by two slots $Sl_1$ and $Sl_2$, which extend into the substrate S from the substrate surface SO at a spacing d therebetween and obliquely towards one another until they intersect or merge beneath the surface SO.

Figure 1:
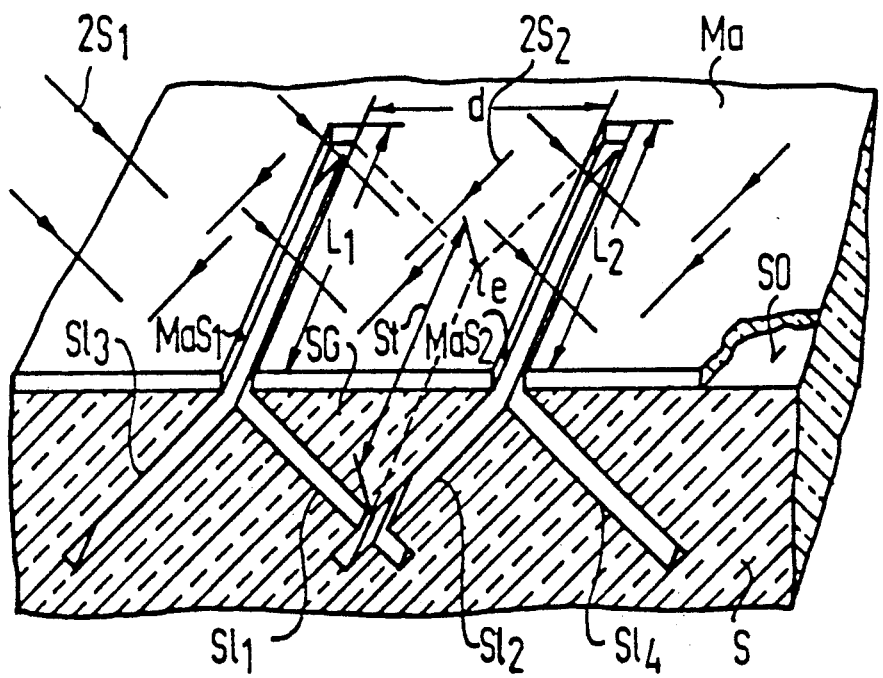
FIG. 1 is a perspective view illustrating the insulating means of the present invention.

As illustrated in FIG. 1, the surface SO of the substrate S is provided with a shadow mask Ma, which has two parallel extending slots $MaS_1$ and $MaS_2$ which have a distance d between them and a length $L_1$ and $L_2$, respectively. Thus, each of the slots $Sl_1$ and $Sl_2$ will have the lengths $L_1$ and $L_2$, respectively, and, as illustrated in FIG. 1, the two slots $Sl_1$ and $Sl_2$ merge inside the substrate S at a point or path St which also will have the length $L_1$ and $L_2$.

Together, the two slots $Sl_1$ and $Sl_2$ form the insulating means J that separate a substrate region or portion SG, which extends between the two slots $Sl_1$ and $Sl_2$ and which has a triangular profile from the substrate S for a defined path St and leaves a monolithic connection in the substrate region SG to the substrate S at least at one end e of this path. In practice, a monolithic connection of the substrate region SG to the substrate S will usually be left at both ends of the path St so that this region SG forms a bridge.

One or more passive components are integrated or can be integrated at the surface of the substrate region SG, and the components will then be optically insulated from the substrate. These components are, thus, optically decoupled from the remainder of the substrate S.

The manufacture of the insulating means J can occur so that the slots $Sl_1$ and $Sl_2$ are produced by a laser-induced, wet-chemical etching with two laser beams or light rays $2S_1$ and $2S_2$ which are directed onto the substrate surface SO obliquely in a direction toward one another. Thus, the two recesses or slots $MaS_1$ and $MaS_2$ insure that the light rays impinge the substrate surface SO only in the regions of the recesses. The laser beams $2S_1$ and $2S_2$ should at least nearly extend parallel. Etching into the depth of the substrate S is carried out with the assistance of these laser beams $2S_1$ and $2S_2$ until the slots $Sl_1$ and $Sl_2$ merge into one another or cross one another in the interior of the substrate S.

In the illustrated example of FIG. 1, every laser beams $2S_1$ or, respectively, $2S_2$ impinges on both of the recesses $MaS_1$ and $MaS_2$ so that two additional slots $Sl_3$ and $Sl_4$ occur in addition to the slots $Sl_1$ and $Sl_2$. These additional slots $Sl_3$ and $Sl_4$ proceed into the depth from the substrate surface SO and diverge from one another obliquely.

Laser-induced, wet-chemical etching, for example, is known and is disclosed in an article by Lum et al, "Improvements in the modulation amplitude of submicron gratings produced in n-InP by direct photoelectrochemical etching", *Applied Physics Letter*, Vol. 47, No. 3, 1 Aug. 1985, pp. 269–271. Thus, since a known and conventional etching process is being used, a further detailed description of the process is not included.

In one exemplary embodiment, two substrate regions SG lying next to one another at a distance of approximately 200 $\mu$m were produced in the n-doped InP substrate (100) surface. The slots $Sl_1$ and $Sl_2$ were etched by a laser-induced, wet-chemical etching with two expanded, nearly plane-wave laser beams that were symmetrically incident onto the substrate surface SO at a 45° angle. The light wavelength of 488 nm and a light intensity of 180 mW/cm$^2$ per beam was present. A vapor-deposited titanium film was used as a shadow mask Ma and had a pair of recesses $MaS_1$ and $MaS_2$ of a size of 3–8 $\mu$m broad that were opened by a lift-off process. A spacing d of the recess $MaS_1$ and $MaS_2$ amounted to 50 $\mu$m. The recesses $MaS_1$ and $MaS_2$ and, thus, the substrate region SG as well, were listed to a length $L_1$ and $L_2$ of 1000 $\mu$m by a local overdepositing or redepositing of a layer of chromium. The depth of 35–40 $\mu$m required for the slots $Sl_1$ and $Sl_2$ was achieved by using an etching solution of $HCl:HNO_3:H_2O$ in a ratio of 1:1:20, respectively, for 30 minutes at 0.7 volts anodic specimen potential, with reference to a calomel electrode.

For the insulation of real components, a contact metallization that is always present can serve as the shadow mask Ma. Since a p-doped material, unlike an n-doped material, is not attacked by visible light in the etching solution, p-doped epitaxial layers can also serve as a shadow mask Ma in the above method.

After the formation of the slots $Sl_1$ and $Sl_2$, a filling of the slots with either a metal or a ternary absorber material can be carried out. An example of a ternary absorber material is InGaAs.

Although various minor modifications may be suggested by those versed in the art, it should be understood that we wish to embody within the scope of the patent granted hereon all such modifications as reasonably and properly come within the scope of our contribution to the art.

We claim:

1. A method for manufacturing an insulating means for insulating a portion of a substrate from the remaining portion of a substrate, said method comprising the steps of providing a substrate having a surface, laser-induced, wet-chemically etching the surface with two laser rays being directed onto the substrate surface obliquely in a direction toward one another to impinge the substrate surface only in strip-shaped regions at a fixed spacing to each other to form slots in the substrate surface, continuing the etching to a depth at which the slots intersect one another in the interior of the substrate to isolate the material between the slots from the remaining portion of the substrate.

2. A method according to claim 1, which includes, prior to the step of laser-induced, wet-chemical etching, providing a shadow mask on the surface of the substrate, said shadow mask having strip-shaped openings defining the strip-shaped regions and then proceeding with the laser-induced, wet-chemical etching.

3. A method according to claim 2, which further includes, subsequent to etching the slots, subsequently filling the slots with a metal.

4. A method according to claim 2, which includes, subsequent to the wet-chemical etching of the slots, filling the slots with a ternary absorber material.

5. A method according to claim 1, which includes, subsequent to the wet-chemical etching of the slots, filling the slots with metal.

6. A method according to claim 1, which includes, subsequent to the step of wet-chemically etching the slots, filling the slots with a ternary absorber material.

* * * * *